(12) United States Patent
Zipfel et al.

(10) Patent No.: US 7,391,007 B2
(45) Date of Patent: Jun. 24, 2008

(54) OPTOELECTRONIC APPARATUS AND METHOD OF OPERATING THE OPTOELECTRONIC APPARATUS IN ORDER TO DETECT AN OBJECT

(75) Inventors: Steffen Zipfel, Seitingen-Oberflacht (DE); Davorin Jaksic, Denzlingen (DE); Kai-Jürgen Waslowski, Emmendingen (DE); Thomas Blümcke, Emmendingen (DE); Ingolf Hörsch, Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 11/637,229

(22) Filed: Dec. 11, 2006

(65) Prior Publication Data

US 2007/0145272 A1    Jun. 28, 2007

(30) Foreign Application Priority Data

Dec. 16, 2005    (DE) .................. 10 2005 060 399

(51) Int. Cl.
*G06M 7/00* (2006.01)
*H01J 40/14* (2006.01)

(52) U.S. Cl. ..................... 250/221; 250/222.1
(58) Field of Classification Search ............... 250/221, 250/222.1, 224, 208.2; 340/555–557
See application file for complete search history.

(56) References Cited

U.S. PATENT DOCUMENTS 5,004,908 A * 4/1991 Nakamura ............. 250/221
2005/0230603 A1* 10/2005 Langland .............. 250/221

FOREIGN PATENT DOCUMENTS

| DE | 19727459 A1 | 1/1999 |
|---|---|---|
| DE | 19907548 C2 | 9/1999 |
| DE | 19907546 C2 | 10/1999 |
| DE | 19938639 A1 | 2/2001 |
| DE | 10033608 A1 | 2/2002 |
| DE | 10113413 A1 | 9/2002 |

(Continued)

OTHER PUBLICATIONS

German Search Report dated Aug. 21, 2006 relating to German Patent Application No. 10 2005 060 399.8, 4 pages.

(Continued)

*Primary Examiner*—Georgia Y. Epps
*Assistant Examiner*—Francis M Legasse, Jr.
(74) *Attorney, Agent, or Firm*—Harness, Dickey & Pierce, P.L.C.

(57) ABSTRACT

A method for the detection of an object includes transmitting light in the direction of a reflector by a transmitter. The transmitted light is reflected by the reflector and is imaged as a reflector image and is detected by the receiver. The reflector image is evaluated and an object detection signal is generated if an at least partial interruption of the transmitted light is recognized. A light object incident onto the receiver outside the detection region is detected by the receiver, is examined for predetermined object properties and is classified as a reflector image or as an interfering light object based on the object properties. In the case of a classification as an interfering light object, a movement of the interfering light object on the receiver is determined and the generation of the object detection signal is executed based on the determined movement of the interfering light object.

20 Claims, 3 Drawing Sheets

FOREIGN PATENT DOCUMENTS

| | | | |
|---|---|---|---|
| DE | 10114784 | A1 | 10/2002 |
| DE | 10126155 | A1 | 12/2002 |
| DE | 10163534 | A1 | 7/2003 |
| DE | 10310768 | A1 | 10/2003 |
| DE | 10304054 | B4 | 8/2004 |
| DE | 10341008 | A1 | 3/2005 |
| DE | 102004053219 | | 4/2006 |
| EP | 1512992 | A1 | 3/2005 |

OTHER PUBLICATIONS

Translation of German Search Report dated Aug. 21, 2006, relating to German patent Application No. 10 2005 060 399.8, 5 pages.

* cited by examiner

OPTOELECTRONIC APPARATUS AND METHOD OF OPERATING THE OPTOELECTRONIC APPARATUS IN ORDER TO DETECT AN OBJECT

CROSS-REFERENCE TO RELATED APPLICATIONS

This application claims the benefit of German Patent Application No. 10 2005 060 399.8, filed Dec. 16, 2005. The disclosure of the above application is incorporated herein by reference in its entirety.

FIELD

The present invention relates to a method for the detection of an object, wherein light is transmitted by a transmitter in the direction of a reflector, the transmitted light is reflected at the reflector and is imaged as a reflector image on a detection region of a receiver with at least one-dimensional spatial resolution and is detected by said receiver and the detected reflector image is evaluated and an object detection signal is generated when an at least partial interruption of the transmitted light is recognized based on the evaluation of the detected reflector image. The invention is furthermore directed to an apparatus for the carrying out of a corresponding method.

BACKGROUND

The statements in this section merely provide background information related to the present disclosure and may not constitute prior art.

With methods and apparatus of the initially named kind, an object detection signal is usually generated when the transmitted light beam or the reflected light beam is interrupted by an object intruding into the protected zone so that, for example, the energy (light intensity, brightness) detected by the receiver is reduced by a predetermined threshold value with respect to the energy detected with a non-interrupted beam path. That region of the receiver is designated as the detection region on which the reflector image comes to lie when no object is present in the beam path. On the evaluation of the detected reflector image, the shape, position or specific encodings of the reflector image can, for example, also be taken into account. Objects of all types, inter alia also persons, are to be understood as an object in the sense of the present application.

It is necessary for the reliable recognition of an object to recognize with high accuracy the interruption of the light beam transmitted or reflected. It is problematic in this connection that an object entering into the visual range of the receiver can reflect or remit both the light transmitted by the transmitter and the light reflected by the reflector, in particular also scattered light or other interfering light, such that the light reflected or remitted at the object is incident onto the detection region of the receiver. In this case, a light intensity can be detected by the receiver in the detection region despite an interruption of the beam path which corresponds to the light intensity with an uninterrupted beam path so that an object detection signal is erroneously not generated.

To avoid these problems, with known processes, for example, polarization filters are used for the optical reduction of the interfering light signals. Since, depending on the application, however, the objects interrupting the transmitted light beam can also comprise depolarizing or polarization changing materials, a reliable recognition of corresponding objects is also not always ensured by this measure.

The problems described also in particular occur when the objects have reflecting regions. In particular when the reflecting regions are present at inclined surfaces or at radii such as rounded edges present at the surface of the object, the probability that a light beam reflected at the object is incident on the receiver is relatively large. The light intensity generated by the reflected regions on the receiver in this case is frequently of the same order of magnitude as the light intensity of the reflector image generated by the reflector with an uninterrupted beam path so that an uninterrupted beam path is erroneously assumed in these cases in the energy evaluation of the reflector image.

Other interfering light signals independent of the transmitted light can also be directly or indirectly incident on the detection region of the receiver, for example via an object, and can thus simulate an uninterrupted beam path despite the interrupted beam path.

SUMMARY

It is an object of the present invention to develop a method and an apparatus of the initially named kind such that the recognition of an interruption of the transmitted light by an object is improved with respect to known methods and apparatus.

Starting from a method of the initially named kind, this object is satisfied in accordance with the invention in that a light object incident onto the receiver outsize the detection region is detected by said receiver, is examined for predetermined object properties and is classified as a reflector image or as an interfering light object based on the object properties determined, in that—in the case of a classification as an interfering light object—a movement of the interfering light object on the receiver is determined, and in that the generation of the object detection signal is carried out in dependence on the determined movement of the interference light object.

All light signals incident onto the receiver (e.g. independent interfering light signals, light signals reflected or remitted at an object or light signals reflected at the reflector) are designated as light objects in the present application. As already described, on the intrusion of an object into the transmitted light beam or into the light beam reflected at the reflector or due to other interfering light, light objects can be imaged onto the receiver such that they are incident into the detection region of the receiver. If the light intensity of the detected light object is approximately equal to the light intensity of the reflector image with an uninterrupted beam path, an object detection signal would erroneously not be generated. Such an erroneous non-detection of an object can be prevented by the classification of the light objects in accordance with the invention and by the movement of the light objects classified as irritating light objects as well as by the generation of the object detection signal in dependence on the determined movement.

If the transmitted light beam or the light beam reflected by the reflector is interrupted by an object without the light reflected or remitted by the object being incident into the detection region of the receiver, the object detection signal is recognized in a customary manner by evaluation of the reflector image. In this context, the evaluation can be restricted to specific properties of the detected reflector image such as brightness, shape, wavelength, pulse frequency or presence of an applied encoding or it can also include a comparison with a predetermined stored reference reflector image.

If an object comprising reflecting regions enters into a predefined capturing zone of the apparatus in accordance with the invention which is defined by a part or by the whole visual range of the receiver, one or more light objects can be generated on the receiver even before the transmitted or reflected light beam is interrupted by the object. These light objects can arise in that, for example, scattered light radiated back by the reflector is incident onto the object intruding into the capturing zone, whereby corresponding light objects are generated on the receiver.

Provided that these light objects are incident onto the receiver outside the detection region and are detected by said receiver, the normal evaluation of the detected reflector image is not impaired. However, preparatory evaluations are made due to the classification in accordance with the invention of these light objects and to the determination of the movement of the interfering light objects which prevent a later incorrect evaluation of the reflector image.

In accordance with an advantageous embodiment of the invention, a predefined region of the receiver forms the detection region. The position, size and shape of the detection region can be learnt and stored, for example, in a learning process without an object being present. This is in particular sensible when the detection region is not changeable in operation or also as an initial detection region after the putting into operation of an apparatus in accordance with the invention.

It is, however, also possible that, in the case of a classification of the light object as a reflector image, the region of the receiver acted on by the reflector image is fixed as the detection region. This can in particular change its position, its size or shape when the transmitter, reflector and/or receiver move with respect to one another in operation due, for example, to vibrations. If the detected light object is thus classified as a reflector object, the detection region can be fixed dynamically with respect to the light object detected.

In accordance with a further preferred embodiment of the invention, the position on the receiver and/or the light intensity and/or the shape and/or the direction of movement and/or the speed of movement and/or the wavelength of the light object are determined as object properties. The transmitted light can advantageously be provided with a code, for example by an encoded reflector or filter, and the light object can be examined for the presence of this code for the determination of the object properties. It is also possible for pulsed light to be used and for the light object to be examined for the presence of the pulse frequency used for the determination of the object property.

The object properties determined can be linked to one another in accordance with predetermined rules. These rules can, for example, be realized by predetermined algorithms, neuronal networks or fuzzy logic. A different weighting of the individual object properties is also possible.

Individual object properties can effect a positive or a negative classification of a light object as a reflector image or as an interfering light image. Furthermore, object properties can only be necessary criteria or also sufficient criteria for a classification. The detected position of a light object on the receiver is thus, for example, a sufficient criterion for the classification as an interfering light object in the case of an unchangeable position of the detection region if it differs from the position of the detection region. In a similar manner, the lack of an encoding applied to the transmitted light, for example via an encoded reflector, or the lack of a predetermined pulse frequency can be a sufficient criterion for the classification as an interfering light object.

In accordance with a preferred embodiment of the invention, the evaluation of the reflector image is interrupted when an impending overlap or a present—at least part—overlap of the interfering light object with the detection region is recognized based on the determined movement of the interfering light object. The light object detected is thus examined by the invention even before it enters into the detection region and coincides therewith. If the transmitted light beam is interrupted by an object so that initially a light object is generated on the receiver outside the detection region, an object detection signal and, associated therewith, a switch state "object detected" is set based on the interruption. In accordance with the invention, it is recognized when this interfering light object moves in the direction of the detection region due to the tracking of the movement of the interfering light object. Before the tracked interfering light object intrudes into this critical region, the evaluation of the reflector image is interrupted in accordance with the invention. It is thereby prevented that an assumed non-interruption of the beam path is recognized on the basis of the interfering light object. Since the switch state was set to "object detected" before the interruption of the evaluation of the reflector image, this switch state is advantageously also maintained during the interruption of the evaluation of the reflector image.

An impending overlap of the interfering light object with the detection region can preferably be recognized by evaluation of the direction of movement, the speed of movement and the position of the tracked interfering light object.

If the tracked interfering light object is again detected outside the detection region, the evaluation of the reflector image can again be started.

In accordance with a further advantageous embodiment of the invention, a brightness of the interfering light object to be expected is subtracted from the brightness detected in the detection region on the evaluation of the reflection image if an impending overlap or a present—at least part—overlap of the interfering light object with the detection region is recognized based on the detected movement of the interfering light object, with the brightness of the interfering light object to be expected being determined from the brightness of the interfering light object before reaching the detection region. In this connection, the shape of the reflector image and/or of the interfering light object can also be evaluated in addition to the brightness.

In this embodiment, the evaluation of the reflector image is not interrupted, but the additional brightness generated by the interfering light object is compensated by subtraction. It is avoided by this compensation that an interfering light object incident into the detection region is erroneously classified as a reflector image and that thus an interruption of the beam path is not recognized.

The movement of the interfering light object is advantageously determined by detection of the respective position of the interfering light object in time-sequential evaluation intervals. An impending overlap of the interfering light object with the detection region is preferably recognized in this connection when, with an assumed unchanging movement of the interfering light object, it would be incident at least partly in the detection region after a predetermined number of evaluation intervals. The number of the evaluation intervals can be predetermined depending on the application.

The use of a receiver with one dimensional spatial resolution is generally sufficient for specific cases. However, a receiver with two dimensional spatial resolution is advantageously used since the number of the interfering light objects detectable using the receiver with two dimensional spatial resolution is substantially increased.

In accordance with a further advantageous embodiment of the invention, a light object incident onto the receiver inside the detection region is also detected by said receiver, is examined for predetermined object properties and is classified as a reflector image or as an interfering light object based on the determined object properties. On a classification as a reflector image, the switch state can be set to "no object present", whereas on a classification as an interfering light object the evaluation of the detected reflector image can be carried out as already described. For example, in this case, an interruption of the evaluation or a subtraction of the brightness of the interfering light object from the total brightness determined in the detection region is also possible.

In accordance with a further advantageous embodiment of the invention, an angle of deviation of the transmitter, that is an angle between the optical axis of the transmitter and the optical axis of an optical element imaging the transmitted light onto the reflector, and/or an angle of deviation of the receiver, that is an angle between the optical axis of the receiver and the optical axis of an optical element imaging the reflected light onto the receiver, is compensated by taking account of the position of the reflector image and/or of the interfering light object on the receiver. When non-spatially resolving receivers are used, a complex adjustment is necessary to keep the angle of deviation as low as possible. Since the accuracy of the detection of a front edge of an object is determined by the angle of deviation, no accurate position determination of the object is possible without a corresponding complex adjustment. The angle of deviation can be compensated on the software side by a corresponding evaluation due to the use of a spatially resolving receiver, in particular a receiver with two dimensional spatial resolution.

Further areas of applicability will become apparent from the description provided herein. It should be understood that the description and specific examples are intended for purposes of illustration only and are not intended to limit the scope-of the present disclosure.

DRAWINGS

The drawings described herein are for illustration purposes only and are not intended to limit the scope of the present disclosure in any way.

DETAILED DESCRIPTION

Figure 2:
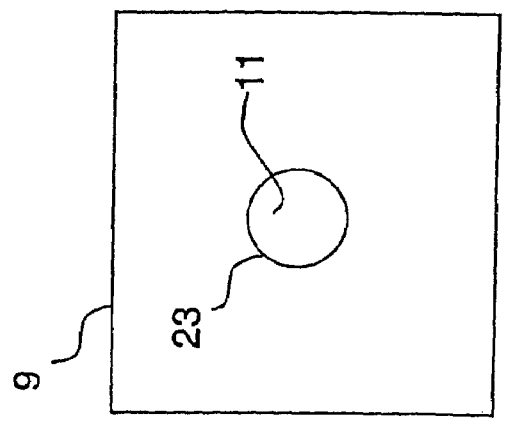
FIG. 2 is a plan view of a two dimensional receiver in accordance with FIG. 1 with a reflector image.

The following description is merely exemplary in nature and is not intended to limit the present disclosure, application, or uses. It should be understood that throughout the drawings, corresponding reference numerals indicate like or corresponding parts and features.

Figure 1:
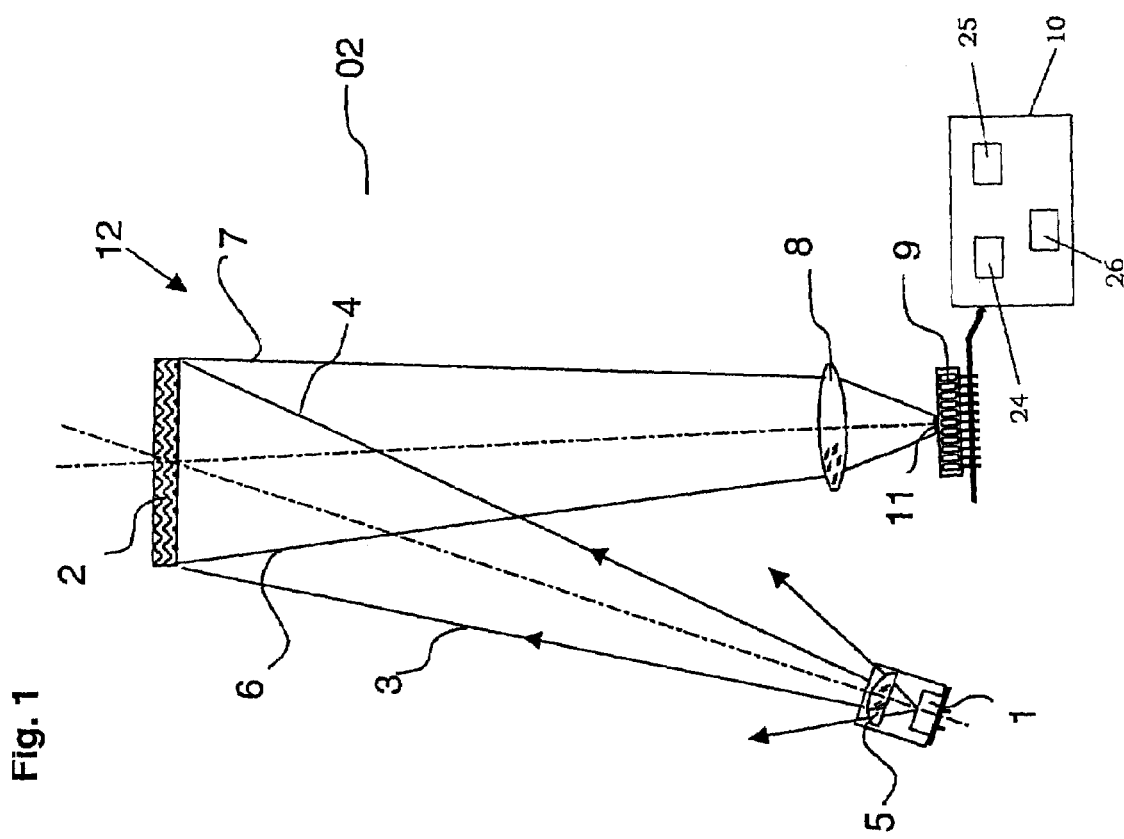
FIG. 1 is a schematic representation of a monitoring apparatus made in accordance with the invention.

FIG. 1 shows a light source which forms a transmitter 1 and which transmits light in the direction of a reflector 2. A section of the transmitted light is bounded by marginal rays 3, 4 and is directed to the reflector 2 via an optical transmitter system 5.

The light represented by marginal rays 6, 7 and reflected by the reflector 2 is imaged on a receiver 9 with two dimensional spatial resolution by an optical receiving system 8. The receiver can be made as a CCD matrix or as a CMOS matrix or as any other suitable receiver element, for example. It is assumed for reasons of simplicity for the further embodiments that the reflector 2 with the optical receiving system 8 is also imaged more or less properly on the spatially resolving receiver 9 with a different object spacing.

The transmitted light can furthermore be expanded as shown in FIG. 1 so that a precise alignment of the transmitter 1 and of the optical transmitter system 5 to the reflector 2 is not necessary. The expansion can, however, also be smaller than shown in FIG. 1 and can in particular also be point-shaped so that, for example, a spatial modulation applied to the transmitted light bundle is imaged on the receiver 9 via the reflector 2 and the optical receiving system 8.

Generally, the light in accordance with the present invention does not have to be visible light, but rather electromagnetic waves of the most varied frequencies are used which are suitable for the setting up of a light barrier. The transmitter 1, reflector 2 and receiver 9 as well as the optical transmitter systems and optical receiver systems 5, 8 are each made in accordance with the electromagnetic waves used.

An evaluation unit 10 is connected to the receiver 9 and the electrical signals generated by the receiver 9 based on the incident light are evaluated by it. An optical capturing zone 12 is formed in front of the optical receiving system 8 and is defined by the optical receiving system 8 and the dimension of the receiver 9.

FIG. 2 schematically shows a plan view of the light-sensitive surface of the receiver 9.

A reflector image 11, i.e. the image of the reflector 2 imaged onto the receiver 9 as a sharp or blurred image by the optical receiving system 8 based on the light reflected at the reflector 2, is shown in the middle of the receiver 9. The reflector image 11 shown corresponds to the state shown in FIG. 1 in which neither the transmitted light nor the reflected light is interrupted by an object. A detection region 23 is thus defined by the region of the reflector image 11 with a non-present object in accordance with FIG. 2.

Figure 3:
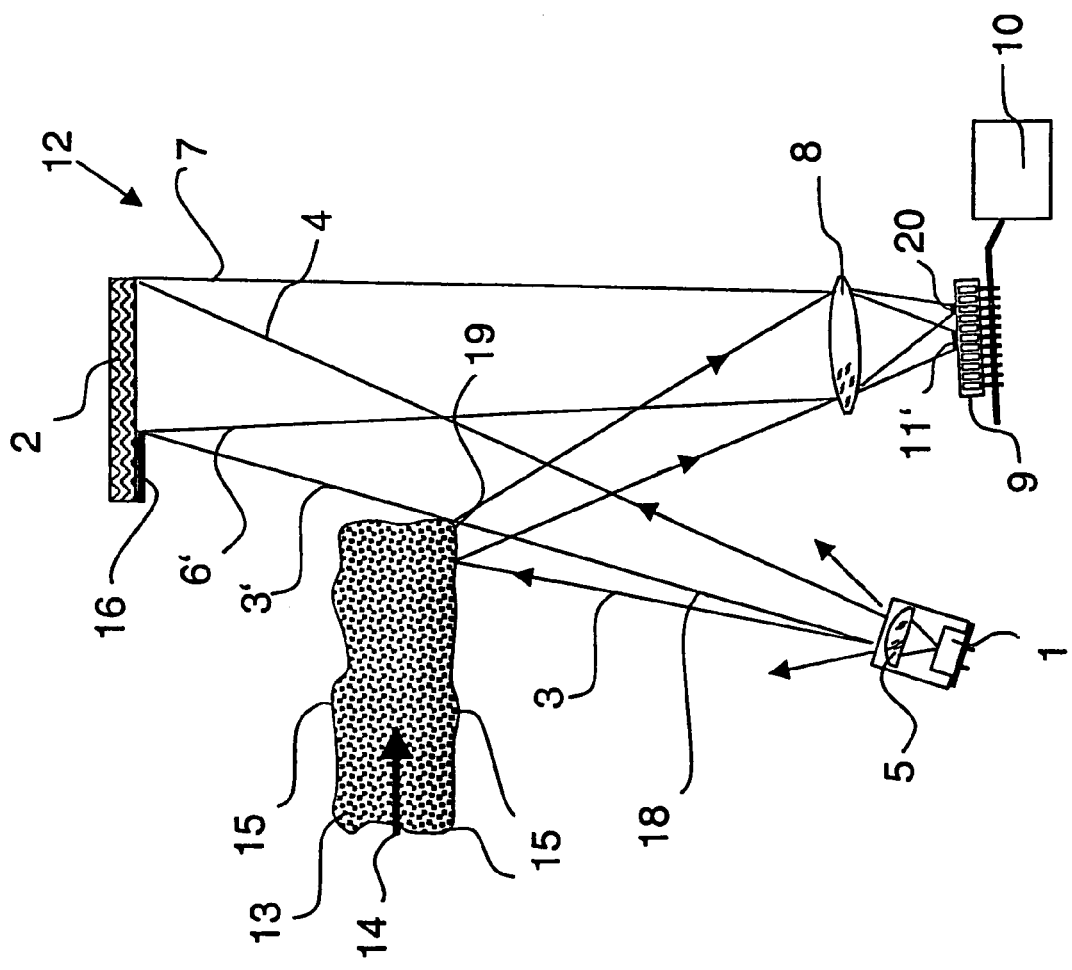
FIG. 3 is the apparatus of FIG. 1 with an object entered into the transmitted light beam.

An object 13 is shown in FIG. 3 which moves in the capturing zone 12 in accordance with an arrow 14. The object 13 has a surface comprising a plurality of arched portions and rounded edges 15 and at least partly has a reflecting surface.

In the position of the object 13 shown in FIG. 3, a part of the transmitted light section bounded by the marginal rays 3, 4 is blocked so that a shadowed region 16 arises on the reflector 2. The light incident on the reflector 2 is bounded accordingly by marginal rays 3', 4 so that the light reflected at the reflector 2 and bounded by marginal rays 6', 7 is imaged onto the receiver 9 by the optical receiving system 8 and generates a reflector image 11 in accordance with FIG. 4 there whose right hand region in FIG. 4 has an indentation 17 due to the shadowing.

Due to the reflective properties of the surface of the object 13, light beams are reflected in the angular region between the marginal rays 3-3' in the direction toward the receiver 9 and form a first interfering light object 20 on this via the optical receiving system 8. On a movement of the object 13 in accordance with the arrow 14 in the direction of the detection region 23 of the receiver 9, the interfering light object 20 is also displaced, as is indicated by an arrow 21 in FIG. 4.

Figure 6:
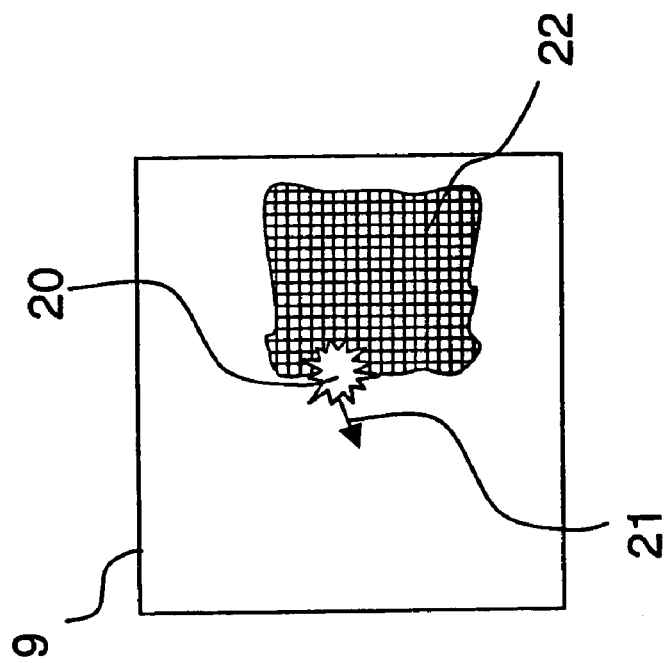

On a further movement of the object 13, the surface of the reflector image 11 (FIG. 5) becomes ever smaller due to the increasing shadowing until it disappears completely on a complete covering of the transmitted light or of the light reflected at the reflector 2 by the object 13 (FIG. 6).

At the same time, the interfering light object 20 migrates along the arrow 21 on the receiver 9 until the interfering light object 20 has completely entered into the region of the original reflector image 11, as is shown in FIG. 6.

Figure 4:
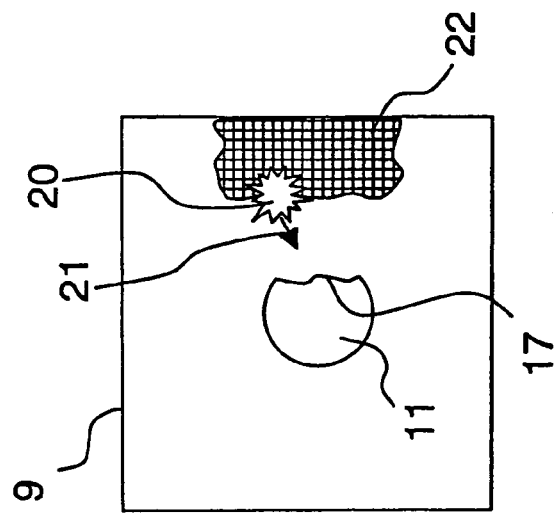
FIGS. 4 to 6 include three different views of the two dimensional sensor in accordance with FIG. 2 during different phases on the entry of the object into the light beam.

In accordance with FIG. 4, the remission image of the object 13 forms a second interfering light object 22 on the receiver 9 which is generated on the receiver 9 based on diffuse reflection of the light incident onto the object 13 by the optical receiving system 8. As can be recognized from FIGS. 5 and 6, the interfering light object 22 becomes larger on a further movement of the object 13 because the remission image, i.e. the interfering light object 22, also moves into the center of the receiver 9.

The function of the invention will be described in more detail in the following.

Generally, an object detection signal is generated using the method in accordance with the invention when an interruption of the transmitted light is recognized based on the evaluation of the actually detected reflector image 11. The portion of the light reflected at the reflector 2 is also to be understood as transmitted light in this context. The evaluation can include a comparison of the detected brightness, shape, size, position or any other suitable property of the detected reflector image 11 with a correspondingly predetermined value such as is present on a non-presence of an object 13 in the beam path.

In addition, however, preparations are made with the method in accordance with the invention that no falsifications of the evaluation can take place at a later time due to light objects detected outside the detection region 23. It is thus avoided with the invention, for example, that—in the constellation of FIG. 6 in which the detected reflector image has admittedly disappeared completely, but the interfering light object 20 is simultaneously incident into the detection region 23 of the receiver 9—an object detection signal is erroneously not generated by an evaluation of the interfering light object 20.

In accordance with the invention, light objects 20 incident onto the receiver 9 outside the detection region 23 are detected by said receiver and are examined for predetermined object properties. If it is recognized based on the determined object properties that the detected light object cannot be the reflector image 11, the detected light object is classified as an interfering light object 20 by a classification unit 24. Furthermore, the movement of the interfering light object 20 on the surface of the receiver 9 indicated by the arrow 21 is continuously determined or is determined in time sequential evaluation intervals by a movement detection unit 25 and a check is made whether an overlap of the interfering light object 20 with the detection region 23 is to be expected based on the movement determined.

Figure 5:
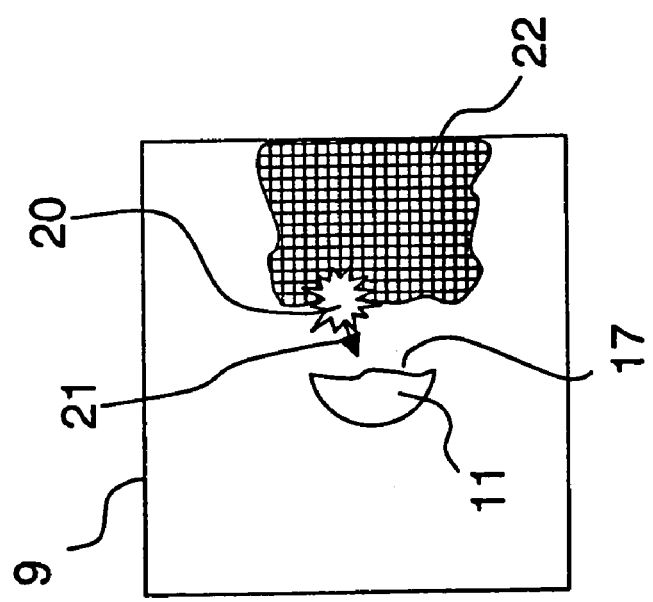

If, for example in accordance with FIGS. 4 and 5, it is recognized based on the detected movement of the interfering light object 20 that the interfering light object 20 will be incident into the detection region 23 in the next evaluation interval, as it is shown in FIG. 6, the evaluation of the reflector image 11 is interrupted for so long, for example, until the interfering light object 20 has again exited the detection region 23. The interfering light object 20 incident into the detection region 23 in accordance with FIG. 6 is therefore not erroneously recognized as a reflector image 11 in accordance with the invention.

An object detection signal is already generated in the states shown in FIGS. 4 and 5 based on the change shape and/or based on the reduced brightness of the detected reflector image 11 associated therewith. The switch state "object detected" associated therewith is maintained during the interruption of the evaluation of the reflector image 11 in accordance with the invention for so long until the interruption of the evaluation of the reflector image 11 is cancelled.

In a further aspect of the invention, it is possible that, instead of the interruption of the evaluation of the reflection image 11, a brightness of the interfering light object 20 to be expected is subtracted from the brightness detected in the detection region 23 by a subtraction unit 26 and the result of this subtraction is used for the evaluation of the brightness of the reflector image 11. The brightness to be expected of the interfering light object 20 is determined in this connection from the brightness of the interfering light object 20 before reaching the detection region 23. For example, the brightness of the interfering light object 20 in the directly preceding evaluation interval can be used. It is generally also possible to determine the brightness of the interfering light object 20 to be expected from the brightness of the interfering light object 20 from a plurality of preceding evaluation intervals, for example by an averaging of these brightness values.

Whereas the apparatus in accordance with the invention is made in the form of a V-shaped optical arrangement in FIGS. 1 and 3, the apparatus in accordance with the invention can generally also be made as an auto-collimation device, in particular using a retro-reflector. For the further improvement of the interference reliability, the apparatus can comprise, in a known manner, a structured illumination and/or a structured reflector.

Furthermore, with the invention, no complex adjustment of the transmitter 1 and the optical transmitter system 5 or of the receiver 9 and the optical receiver system 8 is necessary to avoid angles of deviation of transmitter or receiver occurring. Corresponding angles of deviation only have the result that, for example, the detection region 23 on the receiver 9 is displaced with respect to a position with an angle of deviation equivalent to zero. Since a corresponding displacement also takes place with the interfering light objects 20, 22, corresponding angles of deviation are automatically compensated by reference to the detection region 23.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for the detection of an object, comprising:
    transmitting light in the direction of a reflector (2) using a transmitter (1);
    reflecting the transmitted light at the reflector (2);
    imaging the reflected transmitted light as a reflector image (11) on a detection region of a receiver (9) with at least one-dimensional spatial resolution, wherein the reflector image is detected by said receiver;
    evaluating the detected reflector image;
    generating an object detection signal when an at least partial interruption of the transmitted light is recognized based on the evaluation of the detected reflector image;
    detecting a light object incident onto the receiver (9) outside of a detection region (23) using said receiver;
    examining the light object for predetermined object properties;
    classifying the light object as one of a reflector image and an interfering light object based on the object properties determined; and
    in the case of a classification as an interfering light object, determining a movement of the interfering light object on the receiver (9), wherein the generation of the object detection signal is carried out in dependence on the determined movement of the interfering light object.

2. A method in accordance with claim 1, wherein a predefined region of the receiver forms the detection region.

3. A method in accordance with claim 1, wherein in the case of a classification of the light object as a reflector image, the region of the receiver acted on by the reflector image is fixed as the detection region.

4. A method in accordance with claim 1, wherein the evaluation of the reflector image (11) is interrupted when an impending overlap or a present—at least part—overlap of the interfering light object (20) with the detection region is recognized based on the determined movement of the interfering light object.

5. A method in accordance with claim 4, wherein an object detection state characterized by the object detection signal before the interruption of the evaluation of the reflector image (11) is maintained during the interruption.

6. A method in accordance with claim 1, wherein, on the evaluation of the reflector image (11), a brightness of the interfering light object (20) to be expected is subtracted from the brightness detected in the detection region (23) when an impending overlap or a present—at least part—overlap of the interfering light object (20) with the detection region (23) is recognized based on the detected movement of the interfering light object (20), with the brightness of the interfering light object (20) to be expected being determined from the brightness of the interfering light object (20) before reaching the detection region (23).

7. A method in accordance with claim 4, wherein an impending overlap of the interfering light object (20) with the detection region (23) is recognized when, with an assumed unchanging movement of the interfering light object (20), the latter would be incident at least partly into the detection region (23) after a predetermined number of evaluation intervals.

8. A method in accordance with claim 1, wherein the movement of the interfering light object (20) is determined by detection of the respective position of the interfering light object (20) in time sequential evaluation intervals.

9. A method in accordance with claim 1, wherein at least one of a position on the receiver, a light intensity, a shape, a direction of movement, a speed of movement, and a wavelength of the light object is determined as an object property.

10. A method in accordance with claim 1, wherein the transmitted light is provided with a code, for example by one of an encoded reflector and filter, and the light object is examined for the presence of this code for the determination of the object properties.

11. A method in accordance with claim 1, wherein pulsed light is used, and wherein the light object is examined for the presence of the pulse frequency used for the determination of the object property.

12. A method in accordance with claim 1, wherein a receiver with two dimensional spatial resolution is used as the receiver (9).

13. A method in accordance with claim 1, wherein the object detection signal is generated when the actual brightness of the detected reflector image (11) falls below a predetermined brightness to be expected on the lack of an object.

14. A method in accordance with claim 1, wherein a light object incident onto the receiver (9) inside the detection region (23) is also detected by said receiver, is examined for predetermined object properties and is classified as a reflector image or as an interfering light object based on the object properties determined.

15. A method in accordance with claim 1, wherein at least one of an angle of deviation of the transmitter (1), which is defined as an angle between the optical axis of the transmitter (1) and the optical axis of an optical element (5) imaging the transmitted light onto the reflector (2), and an angle of deviation of the receiver (9), which is defined as an angle between the optical axis of the receiver (9) and the optical axis of an optical element (8) imaging the reflected light onto the receiver (9), is compensated by taking account of the position of the reflector image (11) and/or of the interfering light object (20) on the receiver (9).

16. An apparatus for the detection of an object (13), comprising:
a transmitter (1) transmitting light;
a reflector (2) reflecting the transmitted light;
a receiver (9) with at least one dimensional spatial resolution and having a detection region (23), said receiver being arranged and made for the detection of a reflector image (11) imaged on the receiver (9) by the light reflected by the reflector (2);
an evaluation unit (10) made for the evaluation of the detected reflector image and for the generation of an object detection signal when an at least partial interruption of the transmitted light can be recognized based on the evaluation of the detected reflector image (11),
wherein said evaluation unit comprises:
a classification unit (24) that is provided for the examination of an interfering light object incident onto the receiver (9) outside of a detection region and detected by said receiver for predetermined object properties and for the classification of the light object as one of a reflector image and an interfering light object based on the determined object properties and
a movement detection unit (25) that is provided for the detection of the movement of an interfering light object on the receiver, wherein the evaluation unit (10) is made for the generation of the object detection signal in dependence on the detected movement of the interfering light object.

17. An apparatus in accordance with claim 16, wherein the sensor (9) is made as a sensor with two dimensional spatial resolution.

18. An apparatus in accordance with claim 16, wherein the evaluation unit (10) is made to interrupt the evaluation of the reflector image (20) when one of an impending overlap and a present, at least partial overlap of the interfering light object (20) with the detection region (23) can be recognized based on the movement of the interfering light object (20) detected by the movement detection unit (25).

19. An apparatus in accordance with claim 16, wherein the evaluation unit (10) is made to generate an object detection signal upon the evaluation of the reflector image (11), even when a predetermined brightness of the reflector image (11) to be expected is exceeded by the actual brightness of the detected reflector image (11) if one of an impending overlap and a present, at least partial overlap of the interfering light object (20) with the detection region (23) is recognized based on the movement of the interfering light object (20) detected.

20. An apparatus in accordance with claim 19, wherein said evaluation unit (10) further comprises a subtraction unit (26) with which, on the evaluation of the reflector image (11), a brightness of the interfering light object (20) to be expected is subtracted from the brightness detected in the detection region (23) when an impending, at least part overlap of the interfering light object (20) with the detection region (23) is recognized based on the detected movement of the interfering light object (20), and wherein the evaluation unit (10) is made for the determination of the brightness of the interfering light object (20) to be expected from the brightness of the interfering light object (20) before reaching the detection region (23).

* * * * *